# (12) United States Patent
Ren et al.

(10) Patent No.: US 10,895,147 B2
(45) Date of Patent: Jan. 19, 2021

(54) PIPE THICKNESS ESTIMATION WITH AUTOMATIC CHANNEL QUALITY ASSESSMENT

(71) Applicant: Halliburton Energy Services, Inc., Houston, TX (US)

(72) Inventors: Kai Ren, Madison, WI (US); Ahmed Elsayed Fouda, Spring, TX (US); Ilker R. Capoglu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 41 days.

(21) Appl. No.: 16/469,442

(22) PCT Filed: Oct. 30, 2018

(86) PCT No.: PCT/US2018/058186
§ 371 (c)(1),
(2) Date: Jun. 13, 2019

(87) PCT Pub. No.: WO2019/094225
PCT Pub. Date: May 16, 2019

(65) Prior Publication Data
US 2020/0190969 A1    Jun. 18, 2020

Related U.S. Application Data

(60) Provisional application No. 62/582,791, filed on Nov. 7, 2017.

(51) Int. Cl.
  *G01V 3/00*  (2006.01)
  *E21B 47/085*  (2012.01)
  *G01B 7/06*  (2006.01)

(52) U.S. Cl.
  CPC .............. *E21B 47/085* (2020.05); *G01B 7/10* (2013.01)

(58) Field of Classification Search
  CPC ... G01V 3/28; G01V 3/38; G01V 3/18; G01V 3/20; G01V 3/22; G01V 3/24; G01V 3/26;
  (Continued)

(56) References Cited

U.S. PATENT DOCUMENTS 4,849,699 A * 7/1989 Gill .......................... G01V 3/38
                                                              324/339
9,715,034 B2   7/2017 Omeragic et al.
                    (Continued)

FOREIGN PATENT DOCUMENTS

WO         2017196357          11/2017

OTHER PUBLICATIONS

ISRWO International Search Report and Written Opinion for PCT/US2018/058186 dated Feb. 13, 2019.
(Continued)

*Primary Examiner* — Thang X Le
(74) *Attorney, Agent, or Firm* — Benjamin Ford; C. Tumey Law Group PLLC

(57) ABSTRACT

A method and system for estimating a thickness of at least one casing string in a cased hole may comprise obtaining a plurality of induction measurements from a plurality of channels using a casing inspection tool, computing a quality vector for the plurality of channels, wherein each element of the quality vector is a numeric output, identifying the plurality of channels is a high-quality or a low-quality based at least in part on an evaluation of the quality vector to obtain a high-quality subset of the plurality of channels and a low-quality subset of the plurality of channels, and estimating the thickness of the at least one casing with an inversion using a high-quality subset of the plurality of channels. A system may comprise a multi-channel induction tool and an information handling system. The multi-channel induction
(Continued)

tool may comprise at least one transmitter and at least one receiver.

20 Claims, 6 Drawing Sheets

(58) Field of Classification Search
CPC . G01V 3/30; G01V 3/10; G01V 3/265; G01V 3/02; G01V 3/04; G01V 3/06; G01V 3/104; G01B 7/10; G01B 7/012; G01B 7/30

See application file for complete search history.

(56) References Cited

U.S. PATENT DOCUMENTS

| | | | |
|---|---|---|---|
| 2004/0073371 A1* | 4/2004 | Haugland | G01V 3/28 702/7 |
| 2011/0064167 A1 | 3/2011 | Rezk et al. | |
| 2011/0174541 A1 | 7/2011 | Strachan et al. | |
| 2015/0372842 A1 | 12/2015 | Wicker, Jr. et al. | |
| 2017/0167241 A1 | 6/2017 | Wu et al. | |
| 2018/0106764 A1 | 4/2018 | Fouda et al. | |
| 2018/0172872 A1* | 6/2018 | Fouda | E21B 47/10 |
| 2019/0226322 A1* | 7/2019 | Khalaj Amineh | G01V 3/28 |
| 2020/0284137 A1* | 9/2020 | Khalaj Amineh | E21B 47/085 |

OTHER PUBLICATIONS

D. Abdallah, M. Fahim, K. Al-Hendi, M. Al-Muhailan, etc, "Casing Corrosion Measurement to Extend Asset Life", 2013.

* cited by examiner

| FREQUENCY (Hz) | | RX1 AMPLITUDE/PHASE | | | | | | | TIME COST | RX2 AMPLITUDE/PHASE | | | | | | | TIME COST | RX3 AMPLITUDE/PHASE | | | | | | | TIME COST |
|---|---|---|---|---|---|---|---|---|---|---|---|---|---|---|---|---|---|---|---|---|---|---|---|---|---|
| | | 1 | 2 | 3 | 4 | 6 | 8 | | | 1 | 2 | 3 | 4 | 6 | 8 | | | 1 | 2 | 3 | 4 | 6 | 8 | | |
| ZONE 1 | MANUAL | 1/1 | 1/1 | 1/1 | 1/1 | 1/1 | 1/1 | 1/1 SEC | 1/1 | 1/1 | 1/1 | 1/1 | 1/1 | 1/1 | 1/1 SEC | 1/1 | 1/1 | 1/1 | 1/1 | 1/1 | 1/1 | 1/1 SEC |
| | AUTO 0.75/0.6 | 1/1 | 1/1 | 1/1 | 1/1 | 1/1 | 1/1 | | 1/1 | 1/1 | 1/1 | 1/1 | 1/1 | 1/1 | | 1/1 | 1/1 | 1/1 | 1/1 | 1/1 | 1/1 | |
| ZONE 2 | MANUAL | 1/1 | 1/1 | 1/1 | 1/1 | 1/1 | 1/1 | 1/1 SEC | 1/1 | 1/1 | 1/1 | 1/1 | 1/1 | 1/1 | 11/1 SEC | 1/1 | 1/1 | 1/1 | 1/1 | 1/1 | 1/1 | 53/20 SEC |
| | AUTO 0.75/0.6 | 1/1 | 1/1 | 1/1 | 1/1 | 1/1 | 1/1 | | 1/1 | 1/1 | 1/1 | 1/1 | 1/1 | 1/1 | | 1/1 | 1/1 | 1/1 | 1/1 | 1/1 | 1/1 | |
| ZONE 3 | MANUAL | 1/1 | 1/1 | 1/1 | 1/1 | 1/1 | 1/1 | 1/1 SEC | 1/1 | 1/1 | 1/1 | 1/1 | 1/1 | 1/1 | 26/1 SEC | 1/1 | 1/1 | 1/1 | 0/0 | 0/0 | 0/0 | 15/28 SEC |
| | AUTO 0.75/0.6 | 1/1 | 1/1 | 1/1 | 1/1 | 1/1 | 1/1 | | 1/1 | 1/1 | 1/1 | 1/1 | 1/1 | 0/0 | | 1/1 | 1/1 | 1/1 | 0/0 | 0/0 | 0/0 | |
| ZONE 4 | MANUAL | 1/1 | 1/1 | 1/1 | 1/1 | 1/1 | 1/1 | 1/1 SEC | 1/1 | 1/1 | 1/1 | 1/1 | 1/1 | 0/0 | 15/1 SEC | 1/1 | 1/1 | 1/1 | 1/1 | 1/1 | 1/1 | 14/19 SEC |
| | AUTO 0.75/0.6 | 1/1 | 1/1 | 1/1 | 1/1 | 1/1 | 1/1 | | 1/1 | 1/1 | 1/1 | 1/1 | 1/1 | 1/1 | | 1/1 | 1/1 | 1/1 | 1/1 | 1/1 | 1/1 | |
| ZONE 5 | MANUAL | 1/1 | 1/1 | 1/1 | 1/1 | 1/1 | 1/1 | 1/1 SEC | 1/1 | 1/1 | 1/1 | 1/1 | 1/1 | 0/0 | 55/2 SEC | 1/1 | 1/1 | 1/1 | 1/1 | 1/1 | 1/1 | 110/19 SEC |
| | AUTO 0.75/0.6 | 1/1 | 1/1 | 1/1 | 1/1 | 1/1 | 1/1 | | 1/1 | 1/1 | 1/1 | 1/1 | 1/1 | 0/0 | | 1/1 | 1/1 | 1/1 | 1/1 | 1/1 | 1/1 | |
| ZONE 6 | MANUAL | 1/1 | 1/1 | 1/1 | 1/1 | 1/1 | 1/1 | 1/1 SEC | 1/1 | 1/1 | 1/1 | 1/1 | 1/1 | 1/1 | 10/5 SEC | 1/1 | 1/1 | 1/1 | 1/1 | 1/1 | 1/1 | 6/6 SEC |
| | AUTO 0.75/0.6 | 1/1 | 1/1 | 1/1 | 1/1 | 1/1 | 1/1 | | 1/1 | 1/1 | 1/1 | 1/1 | 1/1 | 1/1 | | 1/1 | 1/1 | 1/1 | 1/1 | 1/1 | 1/1 | |
| ZONE 7 | MANUAL | 1/1 | 1/1 | 1/1 | 1/1 | 1/1 | 1/1 | 1/1 SEC | 1/1 | 1/1 | 1/1 | 1/1 | 1/1 | 1/1 | 1/1 SEC | 1/1 | 1/1 | 1/1 | 1/1 | 1/1 | 1/1 | 1/1 SEC |
| | AUTO 0.75/0.6 | 1/1 | 1/1 | 1/1 | 1/1 | 1/1 | 1/1 | | 1/1 | 1/1 | 1/1 | 1/1 | 1/1 | 1/1 | | 1/1 | 1/1 | 1/1 | 1/1 | 1/1 | 1/1 | |
| SUBTOTAL TIME COST | | | | | | | | 14 SEC | | | | | | | | 180 SEC | | | | | | | | 294 SEC |

*FIG. 4A*

| RX4 AMPLITUDE/PHASE | | | | | | | TIME COST | RX5 AMPLITUDE/PHASE | | | | | | | TIME COST | RX6 AMPLITUDE/PHASE | | | | | | | TIME COST | TOTAL TIME COST | |
|---|---|---|---|---|---|---|---|---|---|---|---|---|---|---|---|---|---|---|---|---|---|---|---|---|---|
| 1 | 2 | 3 | 4 | 6 | 8 | | | 1 | 2 | 3 | 4 | 6 | 8 | | | 1 | 2 | 3 | 4 | 6 | 8 | | | MANUAL | AUTOMATIC |
| 1/1 | 1/1 | 1/1 | 1/1 | 1/1 | 1/1 | | 1/1 SEC | 1/1 | 1/1 | 1/1 | 1/1 | 1/1 | 1/1 | | 1/1 SEC | 1/1 | 1/1 | 1/1 | 1/1 | 1/1 | 1/1 | | 1/1 SEC | | |
| 1/1 | 1/1 | 1/1 | 1/1 | 1/1 | 1/1 | | 43/3 1 SEC | 1/1 | 1/1 | 1/1 | 1/1 | 1/1 | 1/1 | | 44/2 6 SEC | 1/1 | 1/1 | 1/1 | 1/1 | 1/1 | 1/1 | | 31/7 0 SEC | | |
| 1/1 | 0/0 | 0/0 | 0/0 | 1/1 | 1/1 | | | 1/1 | 0/0 | 0/0 | 0/0 | 0/0 | 0/0 | | | 1/1 | 0/0 | 0/0 | 0/0 | 0/0 | 0/0 | | | | |
| 1/1 | 0/0 | 0/0 | 0/0 | 1/1 | 1/1 | | 12/1 2 SEC | 1/1 | 0/0 | 1/1 | 1/1 | 1/1 | 1/1 | | 12/1 5 SEC | 1/1 | 0/0 | 1/1 | 1/1 | 1/1 | 0/0 5 SEC | | 12/3 | | |
| 1/1 | 1/1 | 1/1 | 1/1 | 1/1 | 0/0 | | | 1/1 | 1/1 | 1/1 | 1/1 | 1/1 | 0/0 | | | 1/1 | 1/1 | 1/1 | 1/1 | 1/1 | 0/0 | | | | |
| 1/1 | 1/1 | 1/1 | 1/1 | 1/1 | 1/1 | | 19/2 2 SEC | 1/1 | 1/1 | 1/1 | 1/1 | 1/1 | 1/1 | | 16/2 1 SEC | 1/1 | 1/1 | 1/1 | 1/1 | 1/1 | 1/1 | | 16/2 6 SEC | | |
| 1/1 | 1/1 | 1/1 | 1/1 | 1/1 | 1/1 | | 36/2 9 SEC | 1/1 | 1/1 | 1/1 | 1/1 | 1/1 | 1/1 | | 35/2 5 SEC | 1/1 | 1/1 | 1/1 | 1/1 | 1/1 | 1/1 | | 27/1 6 SEC | | |
| 1/1 | 1/1 | 1/1 | 1/1 | 1/1 | 1/1 | | 5/4 SEC | 1/1 | 1/1 | 1/1 | 1/1 | 1/1 | 1/1 | | 5/5 SEC | 1/1 | 1/1 | 1/1 | 1/1 | 1/1 | 1/1 | | 6/5 SEC | | |
| 1/1 | 1/1 | 1/1 | 1/1 | 1/1 | 1/1 | | 1/1 SEC | 1/1 | 1/1 | 1/1 | 1/1 | 1/1 | 1/1 | | 1/1 SEC | 1/1 | 1/1 | 1/1 | 1/1 | 1/1 | 1/1 | | 1/1 SEC | | |
| 1/1 | 1/1 | 1/1 | 1/1 | 1/1 | 1/1 | | | 1/1 | 1/1 | 1/1 | 1/1 | 1/1 | 1/1 | | | 1/1 | 1/1 | 1/1 | 1/1 | 1/1 | 1/1 | | | | |
| 1/1 | 1/1 | 1/1 | 1/1 | 1/1 | 1/1 | | 217 SEC | 1/1 | 1/1 | 1/1 | 1/1 | 1/1 | 1/1 | | 218 SEC | 1/1 | 1/1 | 1/1 | 1/1 | 1/1 | 1/1 | | 248 SEC | 20 MIN | 5.6 SEC |

FIG. 4B

| AMPLITUDE/PHASE | FREQUENCY | WEIGHT PA | AMPLITUDE/PHASE | FREQUENCY | WEIGHT PA |
|---|---|---|---|---|---|
| RX1 | 1 | 1 | RX3 | 1 | 1 |
|  | 2 | 1 |  | 2 | 1 |
|  | 3 | 1 |  | 3 | 1 |
|  | 4 | 1 |  | 4 | 0 |
|  | 5 | 1 |  | 5 | 1 |
|  | 6 | 1 |  | 6 | 0 |
| RX2 | 1 | 1 | RX4 | 1 | 1 |
|  | 2 | 0 |  | 2 | 1 |
|  | 3 | 0 |  | 3 | 1 |
|  | 4 | 1 |  | 4 | 1 |
|  | 5 | 1 |  | 5 | 1 |
|  | 6 | 0 |  | 6 | 1 |

PIPE THICKNESS ESTIMATION WITH AUTOMATIC CHANNEL QUALITY ASSESSMENT

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

Corrosion of metal pipes is an ongoing issue. Efforts to mitigate corrosion include use of corrosion-resistant alloys, coatings, treatments, and corrosion transfer, among others. Also, efforts to improve corrosion monitoring are ongoing. For downhole casing strings, various types of corrosion monitoring tools are available. One type of corrosion monitoring tool uses electromagnetic (EM) fields to estimate pipe thickness or other corrosion indicators. As an example, an EM logging tool may collect data on pipe thickness to produce an EM log. The EM log data may be interpreted to determine the condition of production and inter mediate casing strings, tubing, collars, filters, packers, and perforations through different channels transmitted by the EM logging tool. This log may be complex and broken down into individual channels. Log data may comprise measurements of lower quality that may be disregarded to prevent skewing of data in post processing inversions. To determine lower quality measurements may require manual inspection by an operator. This manual inspection is often time consuming, raising post processing cost.

BRIEF DESCRIPTION OF THE DRAWINGS

These drawings illustrate certain aspects of some examples of the present disclosure, and should not be used to limit or define the disclosure.

FIGS. 4A and 4B illustrate a chart comparing manual inspection against the automatic channel quality assessment algorithm;

DETAILED DESCRIPTION

Figure 1:
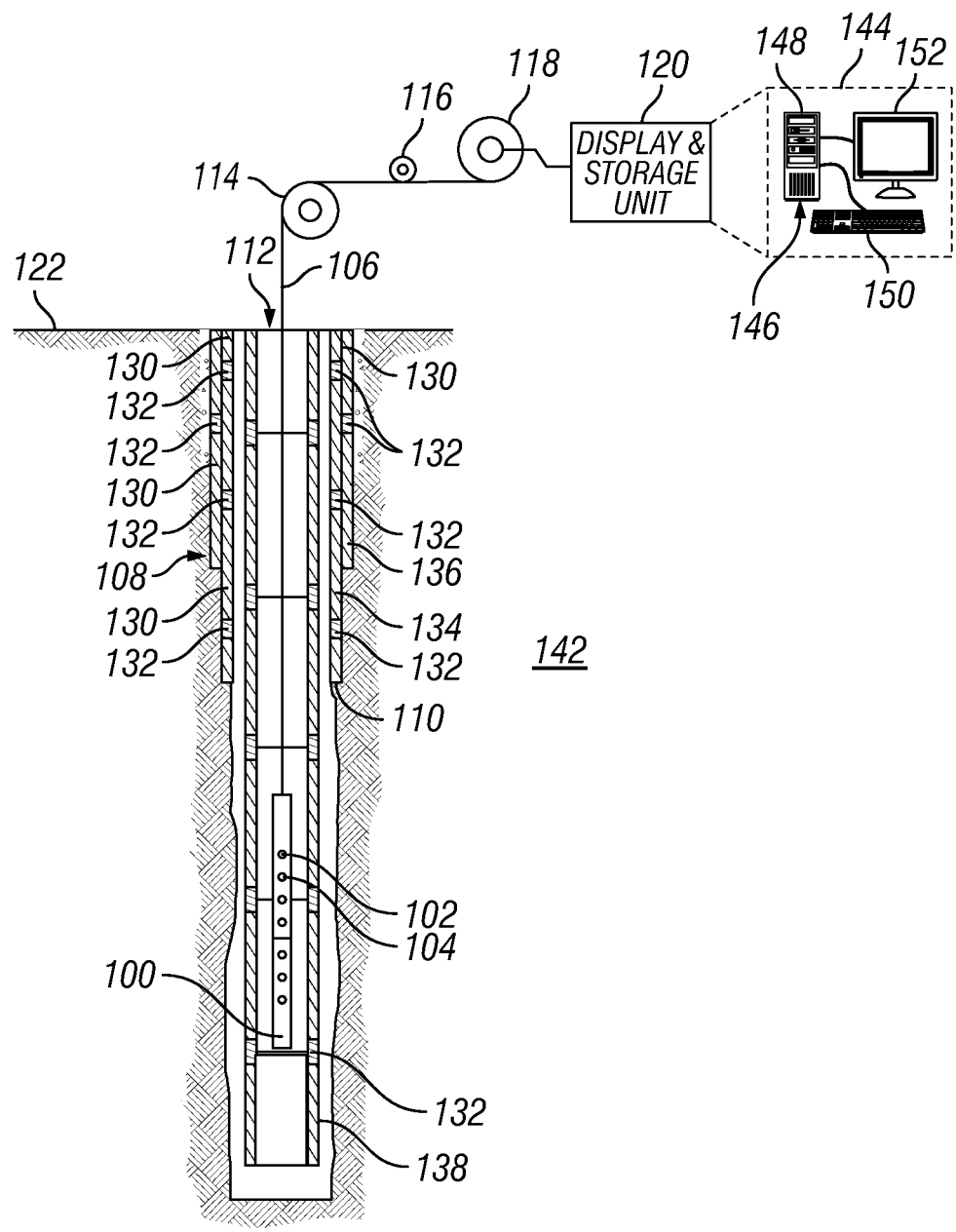
FIG. 1 illustrates an example of an EM logging tool disposed in a wellbore.

This disclosure may generally relate to methods for identifying low quality measurements in an EM log. Identifying and removing low quality measurements from post processing may prevent data from being skewed during post processing inversion techniques. During operations, electromagnetic sensing may provide continuous in situ measurements of parameters related to the integrity of pipes in cased boreholes. As a result, EM sensing may be used in cased borehole monitoring applications. EM logging tools may be configured for multiple concentric pipes (e.g., for one or more) with the first pipe diameter varying (e.g., from about two inches (5 cm) to about seven inches (18 cm) or more). EM logging tools may measure eddy currents to determine metal loss and use magnetic cores at the transmitters. The EM logging tools may use pulse eddy current (time-domain) and may employ multiple (long, short, and transversal) coils to evaluate multiple types of defects in double pipes. It should be noted that the techniques utilized in time-domain may be utilized in frequency-domain measurements. A magnetic core may be used in defect detection in multiple concentric pipes.

Monitoring the condition of the production and intermediate casing strings is crucial in oil and gas field operations. EM eddy current (EC) techniques have been successfully used in inspection of these components. EM EC techniques consist of two broad categories: frequency-domain EC techniques and time-domain EC techniques. In both techniques, one or more transmitters are excited with an excitation signal, and the signals from the pipes are received and recorded for interpretation. The received signal is typically proportional to the amount of metal that is around the transmitter and the receiver. For example, less signal magnitude is typically an indication of more metal, and more signal magnitude is an indication of less metal. This relationship may allow for measurements of metal loss, which typically is due to an anomaly related to the pipe such as corrosion or buckling.

In case of multiple nested pipe stings, the received signal may be anon-linear combination of signals from all pipes. As a result, it is not possible, in general, to use a simple linear relationship to relate the signal received to metal loss or gain for pipe strings composed of three or more nested pipes. In order to address this problem, a method called "inversion" is used. Inversion makes use of a forward model and compares it to the signal to determine the thickness of each pipe. The forward model is executed repeatedly until a satisfactory match between the modeled signal and measured signal is obtained. The forward model typically needs to be run hundreds of times or more for each logging point. As a result, it needs to be a computationally efficient model. In order to achieve the computational efficiency, certain simplifications of the real problem need to be considered for the forward model. One of the most significant simplifications is the centralization assumption, where each pipe is assumed to be perfectly centered with respect to other pipes as well as the measurement instrument. Making such an assumption significantly improves the forward modeling computational efficiency and allows a feasible EM multi-pipe inspection solution. However, it also results in artifacts at depths where such assumption is invalidated, i.e. where eccentricity effects exist. Methods and systems that are disclosed below facilitate identification and removal of such artifacts.

FIG. 1 illustrates an operating environment for an EM logging tool 100 as disclosed herein. EM logging tool 100 may comprise a transmitter 102 and/or a receiver 104. In examples, EM logging tool 100 may be an induction tool that may operate with continuous wave execution of at least one frequency. This may be performed with any number of transmitters 102 and/or any number of receivers 104, which may be disposed on EM logging tool 100. In additional examples, transmitter 102 may function and/or operate as a receiver 104. EM logging tool 100 may be operatively coupled to a conveyance 106 (e.g., wireline, slickline, coiled tubing, pipe, downhole tractor, and/or the like) which may provide mechanical suspension, as well as electrical connectivity, for EM logging tool 100. It should also be noted that EM logging tool 100 may be disposed downhole on a bottom hole assembly attached to a drill string. For example, EM logging tool 100 may be part of a logging while drilling (LWD) or measuring while drilling (MWD) operation. Conveyance 106 and EM logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by EM logging tool 100 may be stored on memory and then processed by display and storage unit 120 after recovery of EM logging tool 100 from wellbore 110. Alternatively, signals recorded by EM logging tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to EM logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. EM logging tool 100 may be dimensioned so that it may be lowered into the wellbore 110 through pipe string 138, thus avoiding the difficulty and expense associated with pulling pipe string 138 out of wellbore 110.

In logging systems, such as, for example, logging systems utilizing the EM logging tool 100, a digital telemetry system may be employed, wherein an electrical circuit may be used to both supply power to EM logging tool 100 and to transfer data between display and storage unit 120 and EM logging tool 100. A DC voltage may be provided to EM logging tool 100 by a power supply located above ground level, and data may be coupled to the DC power conductor by a baseband current pulse system. Alternatively, EM logging tool 100 may be powered by batteries located within the downhole tool assembly, and/or the data provided by EM logging tool 100 may be stored within the downhole tool assembly, rather than transmitted to the surface during logging (corrosion detection).

EM logging tool 100 may be used for excitation of transmitter 102. Transmitter 102 may transmit electromagnetic fields into subterranean formation 142. The electromagnetic fields from transmitter 102 may be referred to as a primary electromagnetic field. The primary electromagnetic fields may produce Eddy currents in casing string 108 and pipe string 138. These Eddy currents, in turn, produce secondary electromagnetic fields that may be sensed along with the primary electromagnetic fields by receivers 104. Characterization of casing string 108 and pipe string 138, including determination of pipe attributes, may be performed by measuring and processing these electromagnetic fields. Pipe attributes may include, but are not limited to, pipe thickness, pipe conductivity, and/or pipe permeability.

As illustrated, receivers 104 may be positioned on the EM logging tool 100 at selected distances (e.g., axial spacing) away from transmitters 102. The axial spacing of receivers 104 from transmitters 102 may vary, for example, from about 0 inches (0 cm) to about 40 inches (101.6 cm) or more. It should be understood that the configuration of EM logging tool 100 shown on FIG. 1 is merely illustrative and other configurations of EM logging tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, EM logging tool 100 may include more than one transmitter 102 and more or less than six of the receivers 104. In addition, transmitter 102 may be a coil implemented for transmission of magnetic field while also measuring EM fields, in some instances. Where multiple transmitters 102 are used, their operation may be multiplexed or time multiplexed. For example, a single transmitter 102 may transmit, for example, a multi-frequency signal or a broadband signal. While not shown, EM logging tool 100 may include a transmitter 102 and receiver 104 that are in the form of coils or solenoids coaxially positioned within a downhole tubular (e.g., casing string 108) and separated along the tool axis. Alternatively, EM logging tool 100 may include a transmitter 102 and receiver 104 that are in the form of coils or solenoids coaxially positioned within a downhole tubular (e.g., casing string 108) and collocated along the tool axis.

Transmission of EM fields by the transmitter 102 and the recordation of signals by receivers 104 may be controlled by display and storage unit 120, which may include an information handling system 144. As illustrated, the information handling system 144 may be a component of the display and storage unit 120. Alternatively, the information handling system 144 may be a component of EM logging tool 100. An information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price. Information handling system 144 may include a processing unit 146 (e.g., microprocessor, central processing unit, etc) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with EM logging tool 100 and/or software executed by processing unit 146. For example, information handling system 144 may enable an operator to select analysis options, view collected log data, view analysis results, and/or perform other tasks.

EM logging tool 100 may use any suitable EM technique based on Eddy current ("EC") for inspection of concentric pipes (e.g., casing string 108 and pipe string 138). EC techniques may be particularly suited for characterization of a multi-string arrangement in which concentric pipes are used. EC techniques may include, but are not limited to, frequency-domain EC techniques and time-domain EC techniques.

In frequency domain EC techniques, transmitter 102 of EM logging tool 100 may be fed by a continuous sinusoidal signal, producing primary magnetic fields that illuminate the concentric pipes (e.g., casing string 108 and pipe string 138). The primary electromagnetic fields produce Eddy currents in the concentric pipes. These Eddy currents, in turn, produce secondary electromagnetic fields that may be sensed along with the primary electromagnetic fields by the receivers 104. Characterization of the concentric pipes may be performed by measuring and processing these electromagnetic fields.

In time domain EC techniques, which may also be referred to as pulsed EC ("PEC"), transmitter 102 may be fed by a pulse. Transient primary electromagnetic fields may be produced due the transition of the pulse from "off" to "on" state or from "on" to "off" state (more common). These transient electromagnetic fields produce EC in the concentric pipes (e.g., casing string 108 and pipe string 138). The EC, in turn, produce secondary electromagnetic fields that may be measured by receivers 104 placed at some distance on the EM logging tool 100 from transmitter 102, as shown on FIG. 1. Alternatively, the secondary electromagnetic fields may be measured by a co-located receiver (not shown) or with transmitter 102 itself.

It should be understood that while casing string 108 is illustrated as a single casing string, there may be multiple layers of concentric pipes disposed in the section of wellbore 110 with casing string 108. EM log data may be obtained in two or more sections of wellbore 110 with multiple layers of concentric pipes. For example, EM logging tool 100 may make a first measurement of pipe string 138 comprising any suitable number of joints 130 connected by collars 132. Measurements may be taken in the time-domain and/or frequency range. EM logging tool 100 may make a second measurement in a casing string 108 of first casing 134, wherein first casing 134 comprises any suitable number of pipes connected by collars 132. Measurements may be taken in the time-domain and/or frequency domain. These measurements may be repeated any number of times and for second casing 136 and/or any additional layers of casing string 108. In this disclosure, as discussed further below, methods may be utilized to determine the location of any number of collars 132 in casing string 108 and/or pipe string 138. Determining the location of collars 132 in the frequency domain and/or time domain may allow for accurate processing of recorded data in determining properties of casing string 108 and/or pipe string 138 such as corrosion.

As mentioned above, measurements may be taken in the frequency domain and/or the time domain.

In frequency domain EC, the frequency of the excitation may be adjusted so that multiple reflections in the wall of the pipe (e.g., casing string 108 or pipe string 138) are insignificant, and the spacing between transmitters 102 and/or receiver 104 is large enough that the contribution to the mutual impedance from the dominant (but evanescent) waveguide mode is small compared to the contribution to the mutual impedance from the branch cut component. The remote-field eddy current (e.g., rFEC) effect may be observed. In a RFEC regime, the mutual impedance between the coil of transmitter 102 and coil of one of the receivers 104 may be sensitive to the thickness of the pipe wall. To be more specific, the phase of the impedance varies as:

$$\varphi = 2\sqrt{\frac{\omega\mu\sigma}{2}}t \qquad (1)$$

and the magnitude of the impedance shows the dependence:

$$\exp[-2(\sqrt{\omega\mu\sigma/2})t] \qquad (2)$$

where $\omega$ is the angular frequency of the excitation source, $\mu$ is the magnetic permeability of the pipe, $\sigma$ is the electrical conductivity of the pipe, and t is the thickness of the pipe. By using the common definition of skin depth for the metals as:

$$\delta = \sqrt{\frac{2}{\omega\mu\sigma}} \qquad (3)$$

The phase of the impedance varies as:

$$\varphi = 2\frac{t}{\delta} \qquad (4)$$

and the magnitude of the impedance shows the dependence:

$$\exp[-2t/\delta] \qquad (5)$$

In RFEC, the estimated quantity may be the overall thickness of the metal. Thus, for multiple concentric pipes, the estimated parameter may be the overall or sum of the thicknesses of the pipes. The quasi-linear variation of the phase of mutual impedance with the overall metal thickness may be employed to perform fast estimation to estimate the overall thickness of multiple concentric pipes. For this purpose, for any given set of pipes dimensions, material properties, and tool configuration, such linear variation may be constructed quickly and may be used to estimate the overall thickness of concentric pipes. Information handling system 144 may enable an operator to select analysis options, view collected log data, view analysis results, and/or perform other tasks.

Monitoring the condition of pipe string 138 and casing string 108 may be performed on information handling system 144 in oil and gas field operations. Information handling system 144 may be utilized with Electromagnetic (EM) Eddy Current (EC) techniques to inspect pipe string 138 and casing string 108. EM EC techniques may include frequency-domain EC techniques and time-domain EC techniques. In time-domain and frequency-domain techniques, one or more transmitters 102 may be excited with an excitation signal and receiver 104 may record the reflected excitation signal for interpretation. The received signal is proportional to the amount of metal that is around transmitter 102 and receiver 104. For example, less signal magnitude is typically an indication of more metal, and more signal magnitude is an indication of less metal. This relationship may be utilized to determine metal loss, which may be due to an abnormality related to the pipe such as corrosion or buckling.

Figure 2:
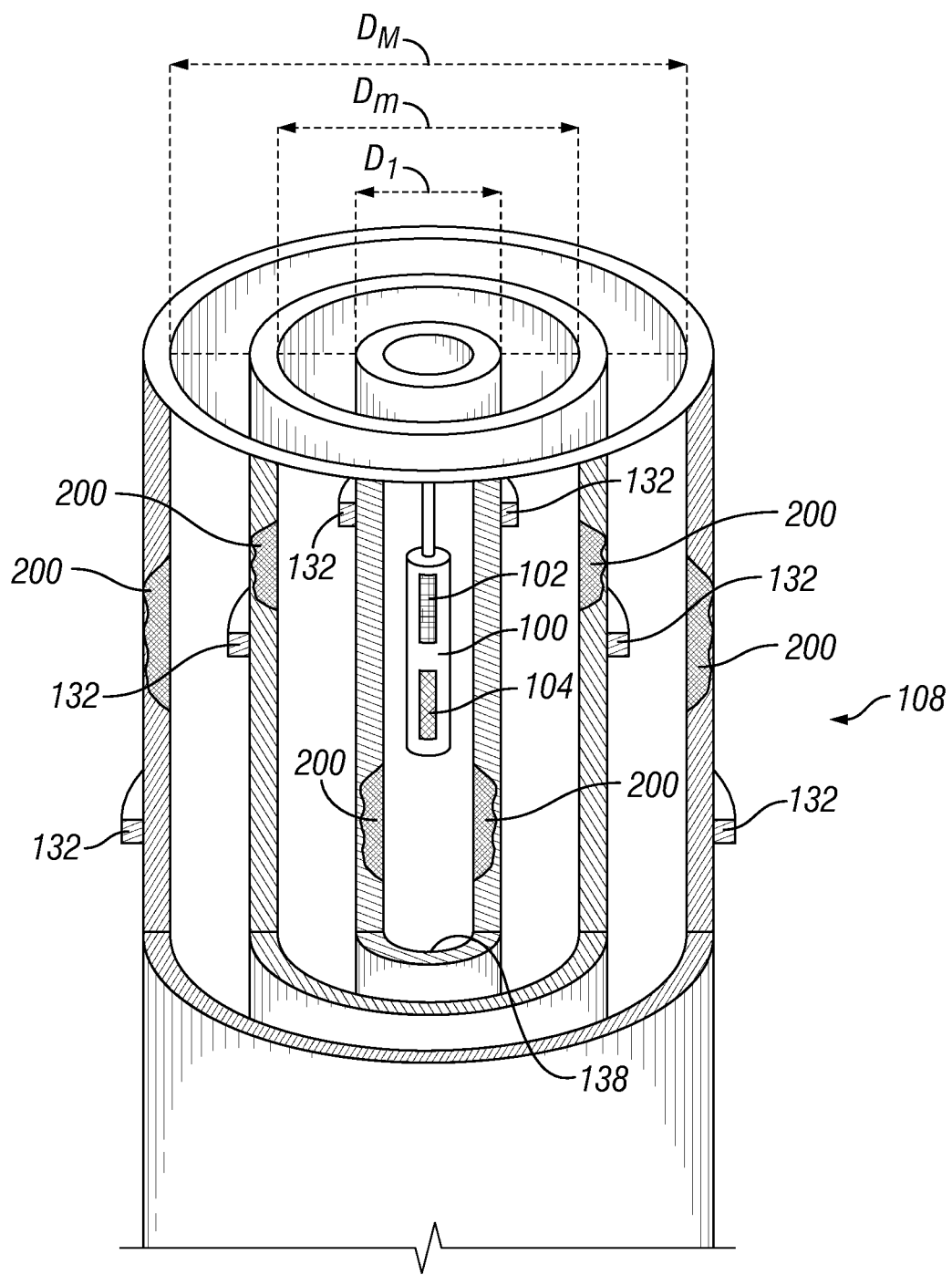
FIG. 2 illustrates an example of anomalies within multiple pipes.

FIG. 2 shows EM logging tool 100 disposed in pipe string 138 which may be surrounded by a plurality of nested pipes (i.e. first casing 134 and second casing 136) and an illustration of anomalies 200 disposed within the plurality of nested pipes. As EM logging tool 100 moves across pipe string 138 and casing string 108, one or more transmitters 102 may be excited, and a signal (mutual impedance between 102 transmitter and receiver 104) at one or more receivers 104, may be recorded.

Due to Eddy current physics and electromagnetic attenuation, pipe string 138 and/or casing string 108 may generate an electrical signal that is in the opposite polarity to the incident signal and results in a reduction in the received signal. Typically, more metal volume translates to more lost signal. As a result, by inspecting the signal gains, it is possible to identify zones with metal loss (such as corrosion). In order to distinguish signals that originate from anomalies at different pipes of a multiple nested pipe configuration, multiple transmitter-receiver spacing and frequencies may be utilized. For example, short spaced transmitters 102 and receivers 104 may be sensitive to first casing 134, while longer spaced transmitters 102 and receivers 104 may be sensitive to second casing 136 and/or deeper (3rd, 4th, etc.) pipes. By analyzing the signal levels at these different channels with inversion methods, it is possible to relate a certain received signal to a certain metal loss or gain at each pipe. In addition to loss of metal, other pipe properties such as magnetic permeability and conductivity may also be estimated by inversion methods. However, there may be factors that complicate interpretation of losses. For example, deep pipe signals may be significantly lower than other signals. Double dip indications appear for long spaced transmitters 102 and receivers 104. Spatial spread of long spaced transmitter-receiver signals for a collar 132 may be long (up to 6 feet (1.8 meters)). Due to these complications, methods may need to be used to accurately inspect pipe features.

EM logging tool 100 may transmit through transmitter 102 a plurality of frequency across a plurality of channels. Recorded measurements across individual channels may be high in quality or low in quality. As disclosed below, a method may be utilized for automatic channel quality assessment based on multi-frequency multi-spacing voltage measurements from EM logging tool 100 as it inspects pipe string 138 (e.g., referring to FIG. 1. Removing low-quality channels may prevent degradation on the inversion algorithm that may process the recorded voltage measurements. Currently, identifying good channels and bad channels may be done through manual inspection of the amplitude and phase of the measured data through the whole log, which may be time consuming. As disclosed, an automatic weight assignment algorithm may be utilized to reduce this time consuming process. The automatic weight assignment algorithm may weight the quality of measurement on a channel based on factors. Factors may include across-covariance coefficients between channels, dynamic ranges of the channels, spatial spectra of channels, average signal levels, standard deviations of channels, signal level histograms, well plan, forward model conformity, and/or the like.

In examples, the automatic channel quality assessment algorithm may be based on the following factors. Facts may include signal quality, the well plan, and conformity with the forward model. Channels may be assigned zero ('0') weight (or marked 'low-quality') based on noise-based criteria. Noisy behavior may be defined in terms of several criteria, including low correlation with other channels, high dynamic range, wide spatial spectra, and/or low average/standard deviation ratio. In examples, channels may be assigned one ('1') weight (or marked 'high-quality') if they are not marked as "low-quality." Receivers 104 may be ordered with respect to distance from transmitter 102, and receivers N+1 may be marked low-quality, where N is the number of concentric strings in pipe string 138 (e.g., referring to FIG. 1). Additionally, the conformity of each channel with the forward model may be checked by comparing known log features to their simulated counterparts. If a large mismatch is present, the channel may not be well described by the forward model and may be marked as low-quality.

Figure 3:
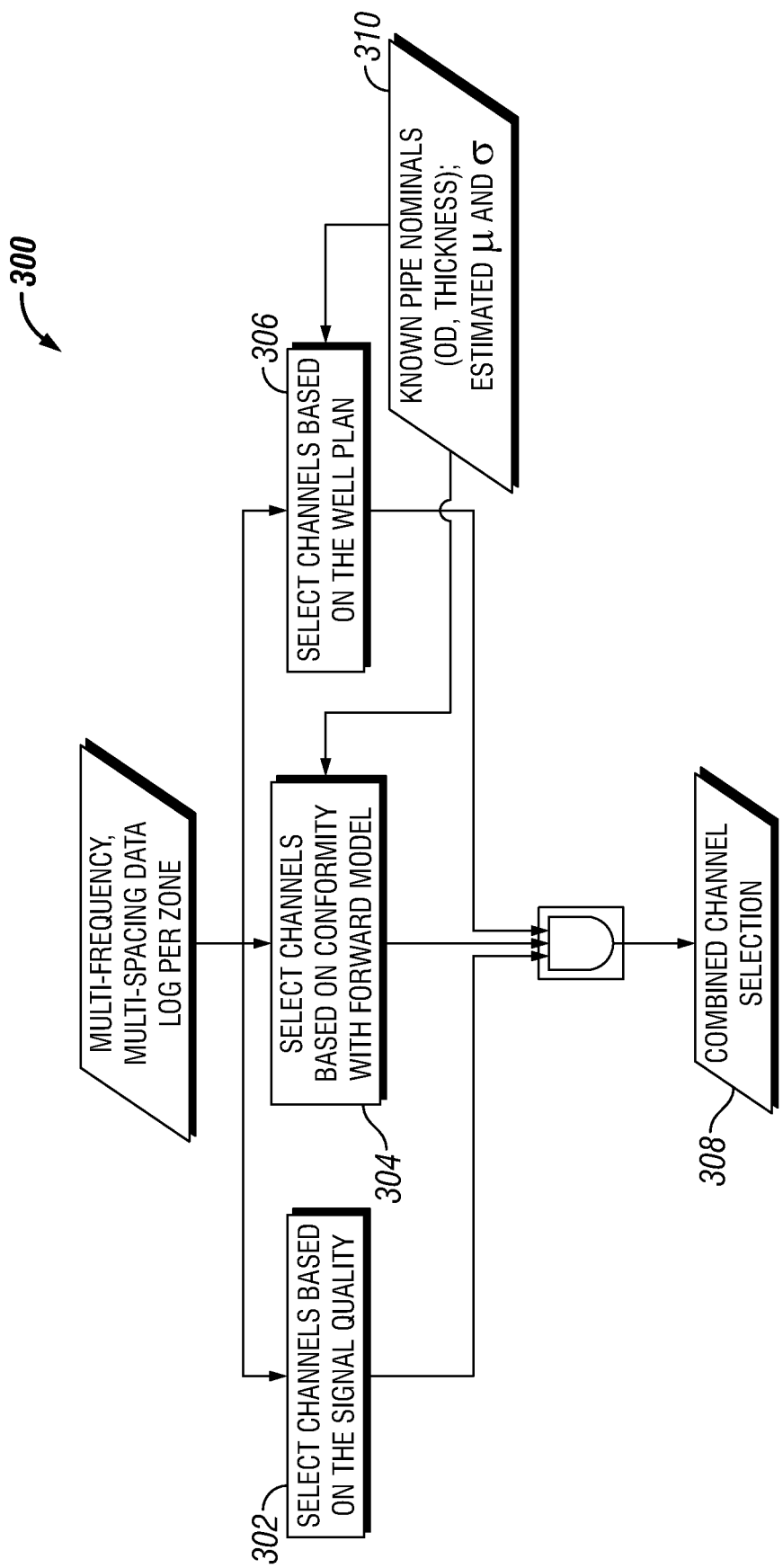
FIG. 3 illustrates a flow chart of an automatic channel quality assessment algorithm.

A visual depiction of the workflow is illustrated in FIG. 3. Automatic channel quality assessment algorithm 300 may include three components. Component 302 may be channel section based on signal quality (noise-based selection). Component 304 may be channel selection based on conformity with the forward model (physics-based selection). Component 306 may be channel selection based on a well plan. Combined selection 308 of the algorithm may be obtained by intersecting the individual selections from component 302, component 304, and/or component 306. Additionally, known pipe nominals 310, estimated $\mu$ and/or $\sigma$ may be added to component 304 and/or component 306.

Each channel transmitted by transmitter 102 (e.g., referring to FIG. 1) may be represented in amplitude and phase form. In examples, each channel may be represented by real and/or imaginary numbers. Channels may be assigned zero ('0') weight (or marked 'low-quality') based on noise-based criteria. Noise based criteria may include a quality vector and/or a quality metric.

A quality vector may be constructed for each channel by computing cross-covariance coefficients, defined below or cross-correlation coefficients between a first channel and a second channel, or a plurality of channels. (See Eq. (6) or Eq. (7) below) A channel may be assigned zero weight if a substantial portion (>25%) of the quality vector is below a certain threshold.

A quality metric may be defined for each channel, wherein the metric is a monotonically decreasing function of the dynamic range (difference between maximum and minimum) of the channel. The metric may be normalized by the minimum, maximum, average, standard deviation, or mode of the channel. A channel is assigned zero weight if the quality metric is below a certain threshold (between 1 and 10)

Channels may also be assigned zero ('0') weight (or marked 'low-quality') based on forward-model conformity. For example, anomaly 200 may be found in a corrosion log, which may correspond to a known metal thickness. This feature may be a collar 132 that may be far enough from all other collars 132 and zone boundaries, which may produce a strong signature.

As discussed above, a quality metric is defined for each channel, wherein the metric is a decreasing function of the mismatch between the said feature and the same feature as computed by the forward model. The larger the mismatch for a given channel, the less accurately that channel is predicted by the forward model. Therefore, the quality factor (for the purposes of an inversion that may be employed for the forward model) may be based on the mismatch. A channel may be assigned zero weight if the quality metric is below a certain threshold (between 0.1 and 10).

Additionally, channels may be assigned zero ('0') weight (or marked 'low-quality') based on a well plan. For example, receivers 104 (e.g., referring to FIG. 1) may be indexed from 1 to $N_{rcv}$, starting from a receiver 104 that may be closest to transmitter 102. A channel may be assigned zero weight if the index of receiver 104 that it may originate from exceeds a certain threshold, wherein this threshold may be chosen to be equal to the number of concentric casing strings in pipe string 138.

Cross-covariance coefficients may be defined as follows. The EM logging tool 100 may be applied for data collection. The measurement may be divided by zones. It may be assumed that good measured data from different frequency channels may correlate with each other for a given receiver 104 (e.g., referring to FIG. 1) in a zone. To identify the noisy channel, the normalized cross-covariance coefficient may be defined as $$cov_a(f_i, f_j) = avg_z \frac{\{V_a(f_i, z) - avg[V_a(f_i, z)]\} \times \{V_a(f_j, z) - avg[V_a(f_j, z)]\}}{\sqrt{avg\{V_a(f_i, z) - avg[V_a(f_i, z)]\}^2 \cdot avg\{V_a(f_j, z) - avg[V_a(f_j, z)]\}^2}} \quad (6)$$

where α denotes the amplitude or phase of the complex measured voltage data V, ff is the frequency, and z is the depth interval per zone.

For the phase of the measured data, the jump may exist after unwrapping. To overcome this issue, Eq. (6) for the phase term may be revised to evaluate the corresponding exponent, which is, $$cov_{ang}(f_i, f_j) = avg_z \frac{\{e^{jV_{ang}(f_i,z)} - avg[e^{jV_{ang}(f_i,z)}]\} \times \{e^{-jV_{ang}(f_i,z)} - avg[e^{-jV_{ang}(f_i,z)}]\}}{\sqrt{avg|e^{jV_{ang}(f_i,z)} - avg[e^{jV_{ang}(f_i,z)}]|^2 \cdot avg|e^{-jV_{ang}(f_i,z)} - avg[e^{-jV_{ang}(f_i,z)}]|^2}} \quad (7)$$

where ang denotes the angle of the complex measured voltage data V.

A noisy channel may not be correlated with any other channels for a given receiver 104 (e.g., referring to FIG. 1), resulting in a small value of the cross covariance coefficient. Through properly choosing two different threshold values for both amplitude and phase of the data, noisy channels may be identified and weights may be automatically assigned, where weight 1 may be assigned if larger than the threshold otherwise assign 0, indicating a noisy channel.

Noisy channels normally have higher dynamic range, which is defined by the difference between the maximum and minimum dB value for the amplitude term and absolute difference for the phase term. It may be assumed that even if there is only one spike in the raw data, the channel is noisy. By choosing two proper threshold values for amplitude and phase dynamic range, noisy channels may be identified even when the channels may be highly correlated.

To assist identifying the noisy channel by the cross-covariance coefficient, the spectrum of the measured voltage may be investigated for each zone where the buffer regions on the top and bottom may be considered. In examples, a wider main lobe or higher order spectral components in noisy channels may be observed.

The average signal level is defined by the mean of the absolute value of the raw data. The standard deviation may also be based on the amplitude. In examples, observing low average signal level and high standard deviation in noisy channels may be observed. Additionally, the amplitude histogram is investigated, which is expected to observe wide spread in noisy channels.

FIGS. 4A and 4B illustrate a log, channel quality assessment algorithm 300 (e.g., referring to FIG. 3) may be verified by measured log data, where log data is divided into 7 zones, a first zone, a second zone, a third zone, a fourth zone, a fifth zone, a sixth zone, and a seventh zone. As illustrated, there are six measurements from six different receivers 104 (e.g., referring to FIG. 1) at different distances from transmitter 102 (e.g., referring to FIG. 1) which may produce six different frequency channels for each receiver 104. Manual inspection of log data may take approximately 20 minutes, where channel quality assessment algorithm 300 (e.g., referring to FIG. 3) may only take about six seconds. The total number of weighted measurements is 7×6×6× 2=504, where a weight=1 indicates a channel that is selected for subsequent processing, and a weight=0 indicates a channel that is excluded from subsequent processing, illustrated in FIGS. 4A and 4B. Each box contains two weights (e.g. '1\1'): the one computed by channel quality assessment algorithm 300, and the one obtained by manual inspection. Channel quality assessment algorithm 300 provides the same accuracy as manual inspection in less time, reducing the time cost from about twenty minutes to about six seconds.

Figures 5, 6:
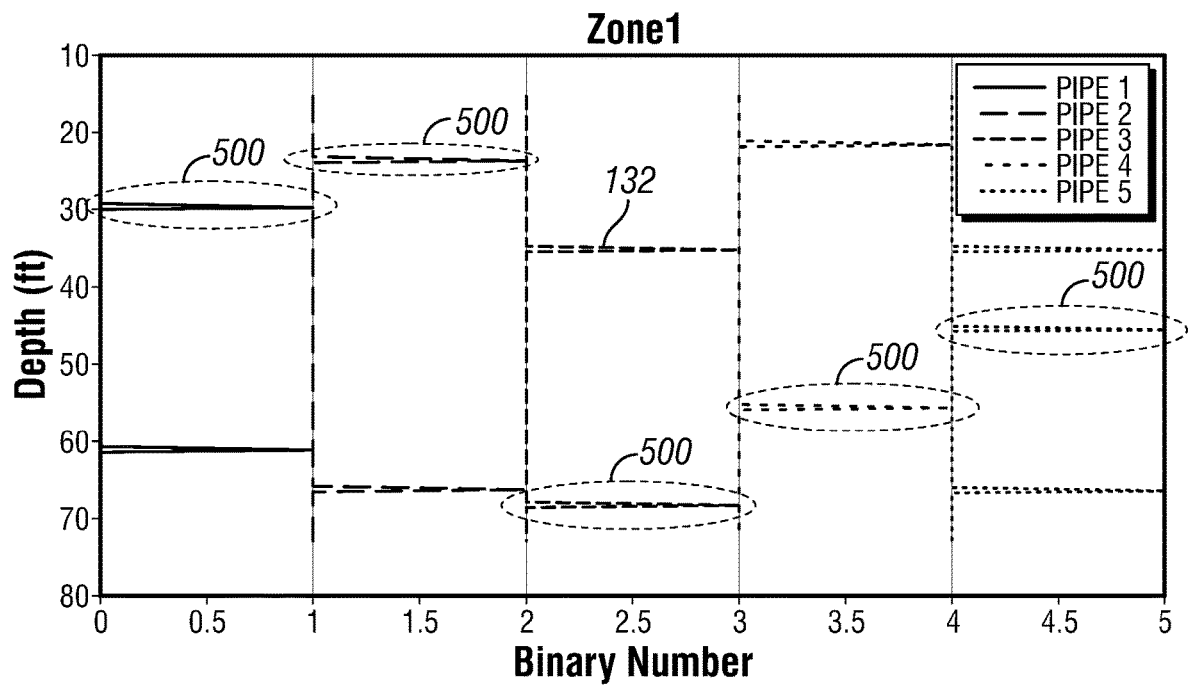
FIG. 5 illustrates identifying good collars.
FIG. 6 illustrates a log of the automatic channel quality assessment algorithm.

FIG. 5 illustrates identifying good collars in a graph of channel quality. The graph is produced from the utilization of algorithm 300 (e.g., referring to FIG. 3) with one zone, discussed above. In this case, there may be four receivers 104 (e.g., referring to FIG. 1) at different distances from transmitter 102 (e.g., referring to FIG. 1) with six different frequency channels for each receiver 104. In FIG. 5, collars 132 on different concentric pipes may be illustrated as spikes on a depth-based plot. Log features may be extracted from the measured log at the 'good' collar depths (marked by circles 500). A total of five log features may be extracted from this example. A 'good' collar (circles 500) is defined as one that that is far enough from all other collars 132 and zone boundaries, and shows strong enough signature.

The log features may be normalized by the baseline signal level on a channel-by-channel basis. Next, these same log features may be simulated using the forward model, subject to the same normalization. A normalized mismatch is defined between these two features (measured and simulated), and those channels whose mismatch is above 0.5 are assigned zero weight (or marked 'low quality'). FIG. 6 illustrates the weights computed by channel quality assessment algorithm 300 (e.g., referring to FIG. 3). As illustrated, five out of twenty-four channels may be marked as low-quality.

In examples, other steps may be used for channel quality assessment algorithm 300. These steps may also be mixed-and-matched with the main embodiment workflow. For example, each channel is represented in amplitude and phase form. (other representations are possible: e.g. real and imaginary).

Channels are assigned zero ('0') weight (or marked 'low-quality') based on noise based criteria. Noise based criteria may comprise a quality metric. A quality metric may be defined for each channel, wherein the metric may be a monotonically decreasing function of the spread in the spatial spectrum of the channel. The metric may be normalized by the minimum, maximum, average, standard deviation, or mode of the spatial spectrum. A channel is assigned zero weight if the quality metric is below a certain threshold (between 1 and 10). In examples, the quality metric may be defined for each channel, wherein the metric is a monotonically increasing function of the ratio of the average signal level in the channel to the standard deviation of the channel. A channel may be assigned zero weight if the quality metric is below a certain threshold (between 1 and 10). Additionally, the quality metric may be defined for each channel, wherein the metric is a monotonically decreasing function of the spread in the histogram of the channel. A channel may be assigned zero weight if the quality metric may be below a certain threshold (between 1 and 10).

In examples, channels may be assigned zero ('0') weight (or marked 'low-quality') based on forward-model conformity as follows. A feature is found in the log, which corresponds to a known metal thickness. This feature is the ratio of baselines between two zones, where the pipe configuration may be uniform in each respective zone. A quality metric may be defined for each channel, wherein the metric may be a decreasing function of the mismatch between the said feature and the same feature as computed by the forward model. The larger the mismatch for a given channel, the less accurately that channel may be predicted by the forward model. Therefore, a quality factor may be (for the purposes of a forward model) based on the mismatch. A channel is assigned zero weight if the quality metric is below a certain threshold (between 0.1 and 10).

The preceding description provides various examples of the systems and methods of use disclosed herein which may contain different method steps and alternative combinations of components.

Statement 1. A method for estimating a thickness of at least one casing string in a cased hole may comprise obtaining a plurality of induction measurements from a plurality of channels using a casing inspection tool; computing a quality vector for the plurality of channels, wherein each element of the quality vector is a numeric output; identifying the plurality of channels is a high-quality or a low-quality based at least in part on an evaluation of the quality vector to obtain a high-quality subset of the plurality of channels and a low-quality subset of the plurality of channels; and estimating the thickness of the at least one casing with an inversion using a high-quality subset of the plurality of channels.

Statement 2. The method of statement 1, wherein the plurality of channels are multi-frequency multi-spacing measurements recorded by a frequency-domain tool.

Statement 3. The method of statements 1 or 2, wherein the plurality of channels are measurements recorded by a time-domain tool at receivers with different sizes and at different time delays.

Statement 4. The method of statements 1 to 3, further comprising reducing the quality vector to a scalar quality metric that is a maximum, average, median, mode, or norm of the quality vector and wherein the scalar quality metric is normalized to fall between two preset values.

Statement 5. The method of statement 4, further comprising marking at least one of the plurality of channels as the high-quality if the scalar quality metric is larger than a numeric threshold of two or more quality vectors.

Statement 6. The method of statements 1 to 4, wherein the numeric output is a function of a first channel and a second channel, and wherein the function is a cross-covariance coefficient, cross-correlation coefficient, or any other functional that quantifies the similarity between the first channel and the second channel.

Statement 7. The method of statements 1 to 4 and 6, wherein the quality vector has only one element, a scalar quality metric, which is a dynamic range of at least one channel of the plurality of channels.

Statement 8. The method of statements 1 to 4, 6, and 7, wherein the quality vector has only one element, a scalar quality metric, which is a scalar measure of a spread of a spatial spectrum of at least one channel of the plurality of channels.

Statement 9. The method of statements 1 to 4 and 6 to 8, wherein the quality vector has only one element, a scalar quality metric, which is a ratio of an average signal level of at least one channel of the plurality of channels over depth to its standard deviation over depth.

Statement 10. The method of statements 1 to 4 and 6 to 9, wherein the quality vector has only one element, a scalar quality metric, which is a spread in a signal level histogram of at least one channel of the plurality of channels.

Statement 11. The method of statements 1 to 4 and 6 to 10, wherein the quality vector has only one element, a scalar quality metric, which is an index of a receiver of at least one channel of the plurality of channels, starting from a receiver closest to a transmitter and wherein at least one channel of the plurality of channels is marked low-quality if a receiver index exceeds a threshold, wherein the threshold is chosen to be equal to a number of nested casing strings.

Statement 12. The method of statements 1 to 4 and 6 to 11, wherein the quality vector has only one element, a scalar quality metric, which is a measure of a forward-model conformity of at least one channel of the plurality of channels, and wherein the forward-model conformity is based on a mismatch between a measured log feature with known pipe thickness and a simulated log feature with known pipe thickness.

Statement 13. The method of statement 12, wherein the simulated log feature with known metal thickness is a collar on the at least one casing string.

Statement 14. The method of statement 12, wherein the simulated log feature with known metal thickness is a transition between two log zones where casing inner diameters, casing outer diameters, or casing weights are different.

Statement 15. The method of statement 1 to 4 and 6 to 11, further comprising determining a numeric threshold with a machine learning algorithm.

Statement 16. The method of statement 1 to 4, 6 to 11, and 15, further comprising training a machine learning algorithm using manual channel picks in previous logs.

Statement 17. A system for detecting a thickness of at least one casing string in a cased hole may comprise a multi-channel induction tool, which may comprise at least one transmitter, wherein the transmitter is configured to emit an electromagnetic field and at least one receiver, wherein the receiver is configured to record a secondary electromagnetic field. The system may further comprise an information handling system configured to compute a quality vector for a plurality of channels, wherein each element of the quality vector is a numeric output, identify the plurality of channels is a high-quality or a low-quality based at least in part on an evaluation of the quality vector to obtain a high-quality subset of the plurality of channels and a low-quality subset of the plurality of channels, and estimate the thickness of the at least one casing with an inversion using the high-quality subset of the plurality of channels.

Statement 18. The method of statement 18, wherein the information handling system is further configured to determine a numeric threshold with a machine learning algorithm.

Statement 19. The method of statements 18 or 19, wherein the information handling system is further configured to train a machine learning algorithm using manual channel picks in previous logs.

Statement 20. The method of statements 18 to 20, wherein the information handling system is further configured to reduce the quality vector to a scalar quality metric that is the maximum, average, median, mode, or norm of the quality vector and wherein the quality vector is normalized to fall between two preset values. It should be understood that, although individual examples may be discussed herein, the present disclosure covers all combinations of the disclosed examples, including, without limitation, the different component combinations, method step combinations, and properties of the system.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for estimating a thickness of at least one casing string in a cased hole, comprising:
    obtaining a plurality of induction measurements from a plurality of channels using a casing inspection tool;
    computing a quality vector for the plurality of channels, wherein each element of the quality vector is a numeric output;
    identifying the plurality of channels is a high-quality or a low-quality based at least in part on an evaluation of the quality vector to obtain a high-quality subset of the plurality of channels and a low-quality subset of the plurality of channels; and
    estimating the thickness of the at least one casing with an inversion using a high-quality subset of the plurality of channels.

2. The method of claim 1, wherein the plurality of channels are multi-frequency multi-spacing measurements recorded by a frequency-domain tool.

3. The method of claim 1, wherein the plurality of channels are measurements recorded by a time-domain tool at receivers with different sizes and at different time delays.

4. The method of claim 1, further comprising reducing the quality vector to a scalar quality metric that is a maximum, average, median, mode, or norm of the quality vector and wherein the scalar quality metric is normalized to fall between two preset values.

5. The method of claim 4, further comprising marking at least one of the plurality of channels as the high-quality if the scalar quality metric is larger than a numeric threshold of two or more quality vectors.

6. The method of claim 1, wherein the numeric output is a function of a first channel and a second channel, and wherein the function is a cross-covariance coefficient, cross-correlation coefficient, or any other functional that quantifies the similarity between the first channel and the second channel.

7. The method of claim 1, wherein the quality vector has only one element, a scalar quality metric, which is a dynamic range of at least one channel of the plurality of channels.

8. The method of claim 1, wherein the quality vector has only one element, a scalar quality metric, which is a scalar measure of a spread of a spatial spectrum of at least one channel of the plurality of channels.

9. The method of claim 1, wherein the quality vector has only one element, a scalar quality metric, which is a ratio of an average signal level of at least one channel of the plurality of channels over depth to its standard deviation over depth.

10. The method of claim 1, wherein the quality vector has only one element, a scalar quality metric, which is a spread in a signal level histogram of at least one channel of the plurality of channels.

11. The method of claim 1, wherein the quality vector has only one element, a scalar quality metric, which is an index of a receiver of at least one channel of the plurality of channels, starting from a receiver closest to a transmitter and wherein at least one channel of the plurality of channels is marked low-quality if a receiver index exceeds a threshold, wherein the threshold is chosen to be equal to a number of nested casing strings.

12. The method of claim 1, wherein the quality vector has only one element, a scalar quality metric, which is a measure of a forward-model conformity of at least one channel of the plurality of channels, and wherein the forward-model conformity is based on a mismatch between a measured log feature with known pipe thickness and a simulated log feature with known pipe thickness.

13. The method of claim 12, wherein the simulated log feature with known metal thickness is a collar on the at least one casing string.

14. The method of claim 12, wherein the simulated log feature with known metal thickness is a transition between two log zones where casing inner diameters, casing outer diameters, or casing weights are different.

15. The method of claim 1, further comprising determining a numeric threshold with a machine learning algorithm.

16. The method of claim 1, further comprising training a machine learning algorithm using manual channel picks in previous logs.

17. A system for detecting a thickness of at least one casing string in a cased hole comprising:
    a multi-channel induction tool comprising:
        at least one transmitter, wherein the transmitter is configured to emit an electromagnetic field; and
        at least one receiver, wherein the receiver is configured to record a secondary electromagnetic field; and
    an information handling system configured to:
        compute a quality vector for a plurality of channels, wherein each element of the quality vector is a numeric output;
        identify the plurality of channels is a high-quality or a low-quality based at least in part on an evaluation of the quality vector to obtain a high-quality subset of the plurality of channels and a low-quality subset of the plurality of channels; and
        estimate the thickness of the at least one casing with an inversion using the high-quality subset of the plurality of channels.

18. The system of claim 17, wherein the information handling system is further configured to determine a numeric threshold with a machine learning algorithm.

19. The system of claim 17, wherein the information handling system is further configured to train a machine learning algorithm using manual channel picks in previous logs.

20. The system of claim 17, wherein the information handling system is further configured to reduce the quality vector to a scalar quality metric that is the maximum, average, median, mode, or norm of the quality vector and wherein the quality vector is normalized to fall between two preset values.

* * * * *